United States Patent Office

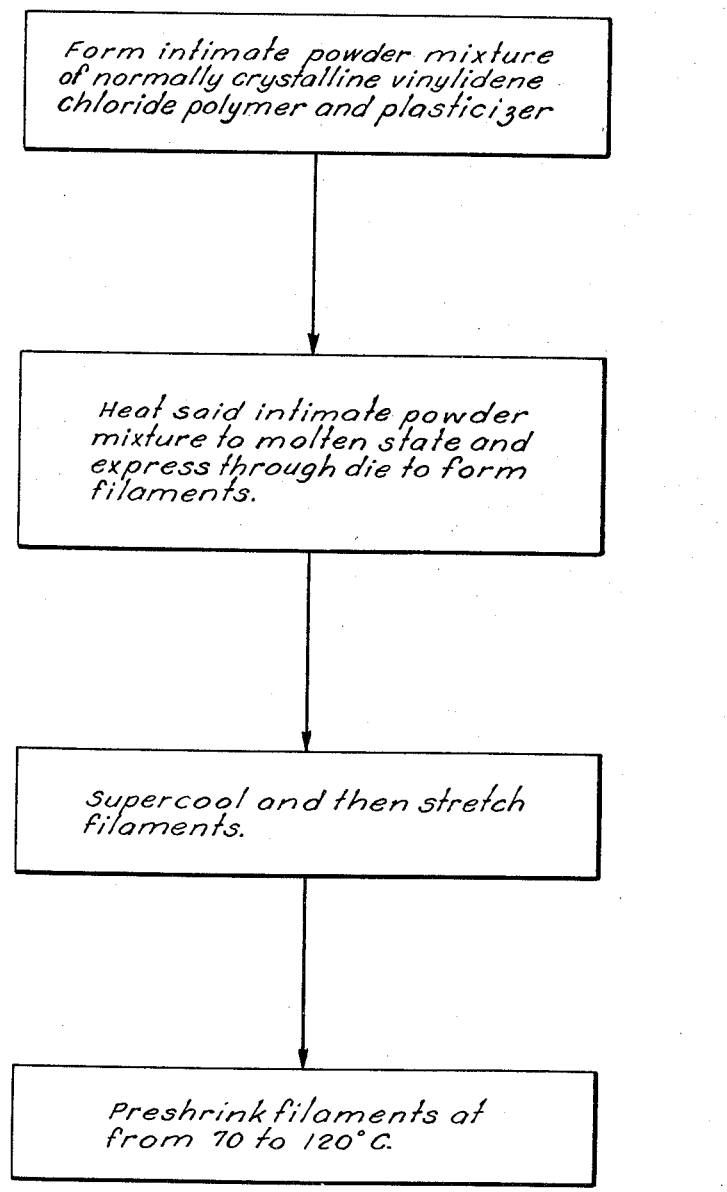

2,956,855
Patented Oct. 18, 1960

2,956,855

DIMENSIONALLY STABLE ORIENTED FILAMENTS AND METHOD FOR PRODUCING THE SAME

Carl B. Havens, Hope, Mich., assignor to The Dow Chemical Company, Midland, Mich., a corporation of Delaware Filed Sept. 1, 1955, Ser. No. 532,101

2 Claims. (Cl. 18—54)

This invention relates to oriented thermoplastic filaments having increased dimensional stability and to a method of preparing the same. More particularly, it relates to oriented filaments prepared from normally crystalline vinylidene chloride polymers which exhibit a reduced tendency to shrink when exposed to high temperatures, as compared with prior filaments of such polymers.

Normally crystalline vinylidene chloride polymers have been fabricated into filaments, fibers, and other forms which have found wide acceptance. When such articles are produced by thermal fabrication methods the polymer requires a plasticizer and stabilizers against the degradative effects of both heat and light. After extrusion and supercooling the filaments are cold-stretched to about four times their extruded length. One of the disadvantages of such filaments, however, has been their tendency to shrink particularly when exposed to elevated temperatures such as found in direct summer sunlight. The cause of the shrinkage has been attributed to the degree of orientation, the type of plasticizer, and to degradation due to sunlight or heat. In the past it has been attempted to control or reduce shrinkage by reducing the amount of initial orientation in the filaments, or by preshrinking the filaments under controlled conditions before the filaments are used. Neither of those methods has met with complete success. It has now been found that shrinkage occurs in two steps, one of which occurs on exposure to heat and the second of which occurs gradually and over a long time, even when the filament is at ordinary temperatures. It is the prolonged and gradual shrinkage which is especially objectionable. It would be desirable if a composition could be formulated which would exhibit less shrinkage than the previously known compositions and the provision of such a composition is the principal object of the invention.

It is a further object to provide a method utilizing such a composition so that filaments having a minimum shrinkage are produced.

The above and related objects are accomplished by means of a method comprising the preparation of a polymer mixture of a normally crystalline vinylidene chloride polymer and a plasticizer consisting of certain trialkyl esters of citric acid, heating the mixture to a molten condition, expressing the molten mixture through a die to form a continuous filament, supercooling the so-formed filament, cold-stretching the filament to produce orientation, and preshrinking the filament at a temperature of at least 70° C.

Normally crystalline vinyidene chloride polymers are well-known in the art. As commonly defined they are polymers of vinylidene chloride with another copolymerizable monomer such as vinyl chloride, vinyl acetate, or acrylonitrile and in which the vinylidene chloride is present in an amount of at least 70 percent by weight.

The plasticizers useful in this invention are those trialkyl esters of citric acid and acetyl citric acid wherein the alkyl groups are alike and contain from 8 to 10 carbon atoms. The esters prepared from primary alcohols are the easiest to prepare and are preferred in the method. Esters having alkyl groups which contain less than 8 carbon atoms do not prevent shrinkage to a useful extent. The esters having greater than 10 carbon atoms are more expensive and difficult to prepare than the 8 to 10 carbon atom esters and no beneficial results are obtained with such esters. The plasticizers may be employed in amounts ranging from 1 to 10 percent. The amount used will vary depending upon the copolymer used and on the properties desired in the filament. Those copolymers with the greatest proportion of vinylidene chloride require larger amounts of plasticizer than those copolymers containing lesser amounts of vinylidene chloride.

Other conventional additives may be used in the usual amounts without any adverse effects. With normally crystalline vinylidene chloride polymers it is usually necessary to incorporate stabilizers against the degredative effects of heat and light.

The plasticizers and other additives may be blended with the polymer in any known manner. It is only necessary that the plasticizer be uniformly distributed throughout the mixture before extrusion occurs.

The filaments are formed by expressing the molten mixture through a filament-forming die. The filaments as thus extruded are of a cross-sectional area considerably larger than that desired, to allow for necking down during subsequent stretching. Immediately after extrusion the filaments are drawn through a bath to supercool the filaments. After supercooling, the filaments are cold stretched to produce orientation. The amount of stretching should be at least 3.5 times the original length of the filament and it is conventional to stretch as fully as possible without rupture. When there is less stretching, the filament will not have sufficient tensile strength for subsequent weaving operations.

Following orientation the filaments are preshrunk before use in subsequent weaving. The preshrinking is conveniently accomplished by subjecting the filaments while relaxed to a temperature of from 70° to 120° C., preferably from 70° to 90° C. Usually the shrinkage is complete in the length of time required to bring the filaments to the temperature of the bath and will range from a few seconds to a few minutes depending upon the composition, the temperature employed, and the size of the filaments. The time required is easily determined by simple preliminary experiment.

Filaments prepared according to the method of this invention show a remarkable resistance to shrinkage over a long period of exposure to elevated temperatures such as are encountered in direct sunlight.

The advantages of the method will be more apparent from the following illustrative examples in which all parts are by weight.

EXAMPLE 1

A series of compositions was prepared comprising a copolymer prepared from a monomeric material consisting of 85 percent by weight of vinylidene chloride and 15 percent by weight of vinyl chloride and a plasticizer. To the compositions was added 3 parts of 2-hydroxy-5-chloro-benzo-phenone, a known light stabilizer, and 1 part of disodium lauryl phosphate, a heat stablizer. The compositions were extruded into filaments which were supercooled and stretched to 4 times their original length. The filaments were preshrunk by immersion in a relaxed condition in boiling water for two minutes. In an accelerated shrinkage test, filament specimens 30 inches long were exposed in an oven at 95° C. and the shrinkage measured. In Table I below the percentage by weight of the plasticizer is given and the balance of the composition is the copolymer.

Table I

| Plasticizer | Percent Plasticizer | Percent Shrinkage after exposure for— | | |
|---|---|---|---|---|
| | | 35 hours | 124 hours | 286 hours |
| Diethyl maleate | 7 | 4.9 | 5.9 | 6.6 |
| Diethyl phthalate | 7 | 5.6 | 7.2 | 8.1 |
| Dinonyl phthalate | 5 | 4.0 | 5.3 | 6.6 |
| α,α'-Diphenyl diethyl ether | 7 | 5.6 | 7.2 | 8.1 |
| Dioctyl sebacate | 5 | 2.9 | 4.7 | 5.9 |
| Trioctyl citrate | 5 | 2.0 | 2.8 | 3.7 |
| Acetyl trioctyl citrate | 5 | 2.0 | 3.0 | 4.0 |
| Acetyl tributyl citrate | 5 | 4.5 | 5.8 | 7.0 |
| Acetyl trihexyl citrate | 5 | 3.3 | 5.0 | 6.6 |

From the above table it can be seen that filaments prepared with the citrates of this invention had from ⅓ to ½ as much shrinkage as filaments prepared with other conventional plasticizers.

I claim:

1. A method for producing dimensionally stable oriented filaments consisting of forming an intimate powder mixture comprising from 90 to 99 percent by weight of a normally crystalline vinylidene chloride polymer and correspondingly from 10 to 1 percent of a plasticizer selected from the group consisting of trialkyl citrates and acetyl trialkyl citrates wherein the alkyl groups contain from 8 to 10 carbon atoms, heating said mixture to a molten state, expressing said molten mixture through a die to form filaments, supercooling said filaments, stretching said filaments to at least 3.5 times their original length, and preshrinking the so-oriented filaments by exposure to a temperature of from 70° to 120° C. until shrinkage is complete.

2. An oriented filament of a crystalline vinylidene chloride polymer plasticizer with from 1 to 10 percent of a material selected from the group consisting of trialkyl citrates and acetyl trialkyl citrates wherein the alkyl groups contain from 8 to 10 carbon atoms characterized by having lower shrinkage when exposed to elevated temperatures than prior known oriented filaments of the same polymer.

References Cited in the file of this patent

UNITED STATES PATENTS

| | | |
|---|---|---|
| 2,344,511 | Harder | Mar. 21, 1944 |
| 2,420,565 | Rugeley | May 13, 1947 |
| 2,517,351 | Reid | Aug. 1, 1950 |
| 2,543,027 | Jones | Feb. 27, 1951 |
| 2,603,838 | Lowry et al. | July 22, 1952 |
| 2,695,280 | Dazzi | Nov. 23, 1954 |
| 2,703,791 | Butler | Mar. 8, 1955 |
| 2,737,436 | Boeuf | Mar. 6, 1956 |

OTHER REFERENCES

Prescott et al.: Modern Plastics, October 1952, "Citric Acid Ester Plasticizer," pages 134, 136, 138, 200 and 201.